United States Patent
Singh et al.

(10) Patent No.: US 10,412,435 B2
(45) Date of Patent: Sep. 10, 2019

(54) TECHNIQUES TO DYNAMICALLY ENGAGE A REDUCED-COLOR MODE FOR STREAMING VIDEO ENCODING

(71) Applicant: WhatsApp Inc., Menlo Park, CA (US)

(72) Inventors: Manpreet Singh, Los Altos Hills, CA (US); Brian Lange Acton, Palo Alto, CA (US); Jan Boris Koum, Santa Clara, CA (US)

(73) Assignee: WHATSAPP INC., Menlo Park, CA (US)

( * ) Notice: Subject to any disclaimer, the term of this patent is extended or adjusted under 35 U.S.C. 154(b) by 0 days.

(21) Appl. No.: 15/813,575

(22) Filed: Nov. 15, 2017

(65) Prior Publication Data
US 2019/0149867 A1 May 16, 2019

(51) Int. Cl.
*H04N 7/173* (2011.01)
*H04N 21/2662* (2011.01)
*H04N 21/647* (2011.01)
*H04N 19/186* (2014.01)

(52) U.S. Cl.
CPC ....... *H04N 21/2662* (2013.01); *H04N 19/186* (2014.11); *H04N 21/647* (2013.01)

(58) Field of Classification Search
CPC . H04N 21/2662; H04N 21/186; H04N 21/647
USPC ................................................ 725/19, 116
See application file for complete search history.

(56) References Cited

U.S. PATENT DOCUMENTS

| | | | |
|---|---|---|---|
| 2004/0233844 A1* | 11/2004 | Yu | H04L 12/5602 370/230 |
| 2005/0063596 A1* | 3/2005 | Yomdin | G06T 9/00 382/232 |
| 2013/0301700 A1* | 11/2013 | Kwon | H04N 19/172 375/240.02 |

* cited by examiner

*Primary Examiner* — Jivka A Rabovianski

(57) ABSTRACT

Techniques to dynamically engage a reduced-color mode for streaming video encoding are generally described. For example, in one embodiments, an apparatus may include an encoding configuration component operative to receive network performance information for a video stream at a sending device, the video stream using a first number of variable bits for color encoding; and assign a reduced-color mode to a media component based on the network performance information, the media component operative to generate the video stream in the reduced-color mode, wherein the reduced-color mode uses a second number of variable bits for color encoding, the second number less than the first number, and a network component operative to send the video stream from the sending device to a receiving device using the reduced-color mode. Other embodiments are described and claimed.

16 Claims, 10 Drawing Sheets

*400A*

Generate a video stream at a sending device using a first number of variable bits for color encoding
*402*

Send the video stream from the sending device to a receiving device
*404*

Receive network performance information for the video stream
*406*

Generate the video stream in a reduced-color mode based on the network performance information, in which the reduced-color mode uses a second number of variable bits for color encoding, the second number less than the first number
*408*

Send the video stream from the sending device to the receiving device using the reduced-color mode
*410*

Receive a video stream at a server device from a sending device, the video stream generated at the sending device using a first number of variable bits for color encoding
*422*

Send the video stream to a receiving device
*424*

Receive the video stream from the sending device in a reduced-color mode based on network performance information, in which the reduced-color mode uses a second number of variable bits for color encoding, the second number less than the first number
*426*

Send the video stream to the receiving device, the video stream using the reduced-color mode
*428*

*FIG. 4B*

TECHNIQUES TO DYNAMICALLY ENGAGE A REDUCED-COLOR MODE FOR STREAMING VIDEO ENCODING

BACKGROUND

Users of mobile devices, such as smartphones, may use their mobile devices to execute applications. These applications may perform communications and network tasks on behalf of their user. An application may comprise a messaging client for communication between users. This communication may include the transmission of streaming content, including streaming combined video and audio content such as a video call exchange.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to dynamically engage a reduced-color mode for streaming video encoding. In one embodiment, an apparatus may comprise an encoding configuration component operative to receive network performance information for a video stream at a sending device, the video stream using a first number of variable bits for color encoding; and assign a reduced-color mode to a media component based on the network performance information, the media component operative to generate the video stream in the reduced-color mode, wherein the reduced-color mode uses a second number of variable bits for color encoding, the second number less than the first number, and a network component operative to send the video stream from the sending device to a receiving device using the reduced-color mode. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4A illustrates an embodiment of a first logic flow for the system of FIG. 1.

FIG. 4B illustrates an embodiment of a second logic flow for the system of FIG. 1.

DETAILED DESCRIPTION

Figure 1:
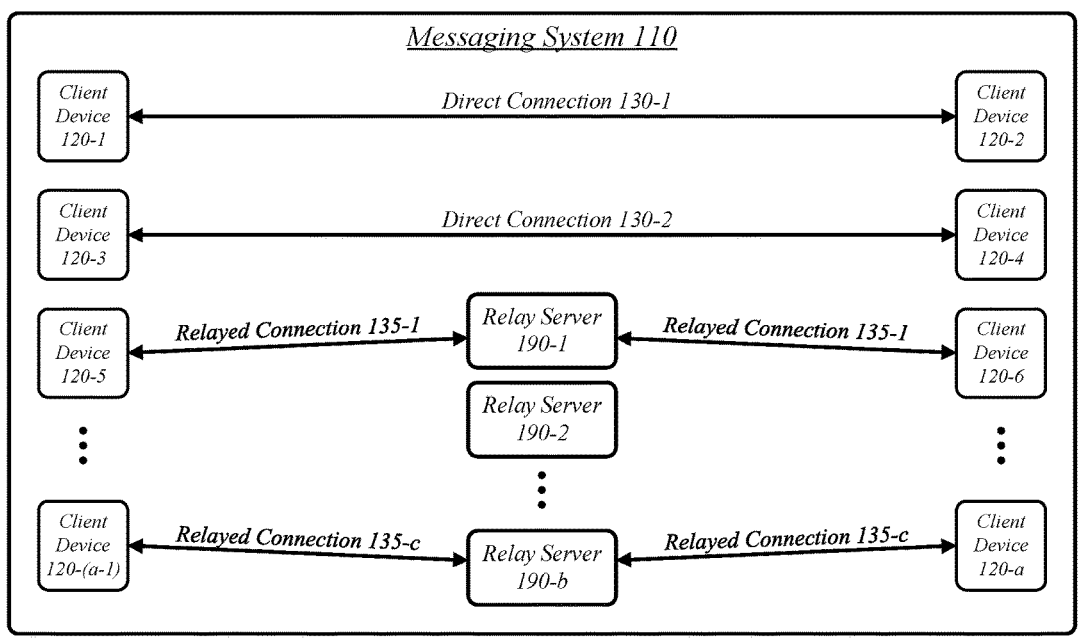
FIG. 1 illustrates an embodiment of a streaming media system.

Users may stream media content from their devices. This may include media content captured locally on a mobile device, for instance, the streaming of live audio and video during a video call. It may also include media content stored on the mobile device, such as a video stored locally.

The streaming of media content may be performed based on the assignment of one or more encoding settings to a media component responsible for the encoding of the streaming media content. For instance, the media content may be encoded in order to fit within a bitrate limit defined by a target bitrate, with the target bitrate thereby serving as a maximum limit for the encoding of media content. The media content may be encoded according to configuration of one or more encoding modes.

An encoding mode may indicate what color range (color gamut range) or number of possible colors a video stream should be encoded using. While users may appreciate full color where sufficient bandwidth is available, users may prefer that the color palette for a video be reduced where bandwidth is limited, rather than a reduction in resolution, frame rate, or reliability. As such, the video stream may be encoded with a reduced color range, such that the possible variation in color is reduced beyond a normal color range used for the video encoding.

For instance, the video stream may specify the color of each pixel according to a color model using one luma value representing luminance or brightness and two chrominance values representing the hue and saturation of the pixel. To increase encoding compression, the chrominance values may be constrained to a limited range of values. For example, if 8 bits are used to encode each of hue and saturation, 256 different values of each hue and saturation may be represented. These 256 values may be linearly scaled to a subset of these values, such as 128 values, thereby halving the color range. Or, in an alternative embodiment, specific bits may be locked to 0. This may be used to reduce the color granularity of the video rather than reducing its color range. These techniques may be used individually or in combination.

These encoding settings may be determined based on the gathering of network performance information in order to prevent overwhelming a network connection and to avoid poor video playback performance due to dropped frames. An overwhelmed network connection may result in delay or periodic interruption in the delivery of the media content, which may result in unsatisfactory playback of the media content, particularly where the media content is immediate and live and particularly where the media content is part of an interactive exchange (e.g., an interactive audio or video call). Proper determination of encoding settings may therefore improve the video playback experience for the receiver of a video stream.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a streaming media system 100. In one embodiment, the streaming media system 100 may comprise a computer-implemented system having software applications comprising one or more components. Although the streaming media system 100 shown in FIG. 1 has a limited number of elements in a certain topology, it may be appreciated that the streaming media system 100 may include more or less elements in alternate topologies as desired for a given implementation.

A messaging system 110 may be generally arranged to receive, store, and deliver messages. The messaging system 110 may store messages while messaging clients, such as may execute on client devices 120 are offline and deliver the messages once the messaging clients are available. The messaging system 110 may empower the engagement and performance of other communication tasks, such as audio and/or video calls.

A plurality of client devices 120 may operate as part of the streaming media system 100, transmitting messages and otherwise communicating between each other as part of a messaging system 110. The client devices 120 may execute messaging clients for the messaging system 110, wherein each of the client devices 120 and their respective messaging clients are associated with a particular user of the messaging system 110. In some embodiments, the client devices 120 may be cellular devices such as smartphones and may be identified to the messaging system 110 based on a phone number associated with each of the client devices 120. In some embodiments, the client devices 120 may be identified to the messaging system 110 based on a user account registered with the messaging system 110—and potentially a social networking system that comprises or is associated with the messaging system 110—and logged into from the messaging client executing on the client devices 120. In general, each messaging client may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a messaging system 110 using web browser accessing a web server, for instance.

Streaming network connections within the messaging system 110 may be performed directly or via relay servers 190. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay server provided as part of the messaging system 110, the relay server then forwarding the network packets to the destination client device. Relay servers 190 may be used, for instance, to bridge NAT devices that are not configured to sufficiently expose a destination client device for the performance of a direct connection.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Streaming media system 100 may include an authorization server (or other suitable component(s)) that allows users to opt in to or opt out of having their actions logged by streaming media system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of streaming media system 100 and other elements of a messaging system through blocking, data hashing, anonymization, or other suitable techniques as appropriate. For instance, a user may be empowered to configure privacy settings determining whether network usage, such as streaming communication, is logged by the streaming media system 100 and analyzed. In some embodiments, a user may be presented with information regarding may be collected and how that information may be used, such as informing the user that collected information may be anonymized prior to analysis.

Figure 2:
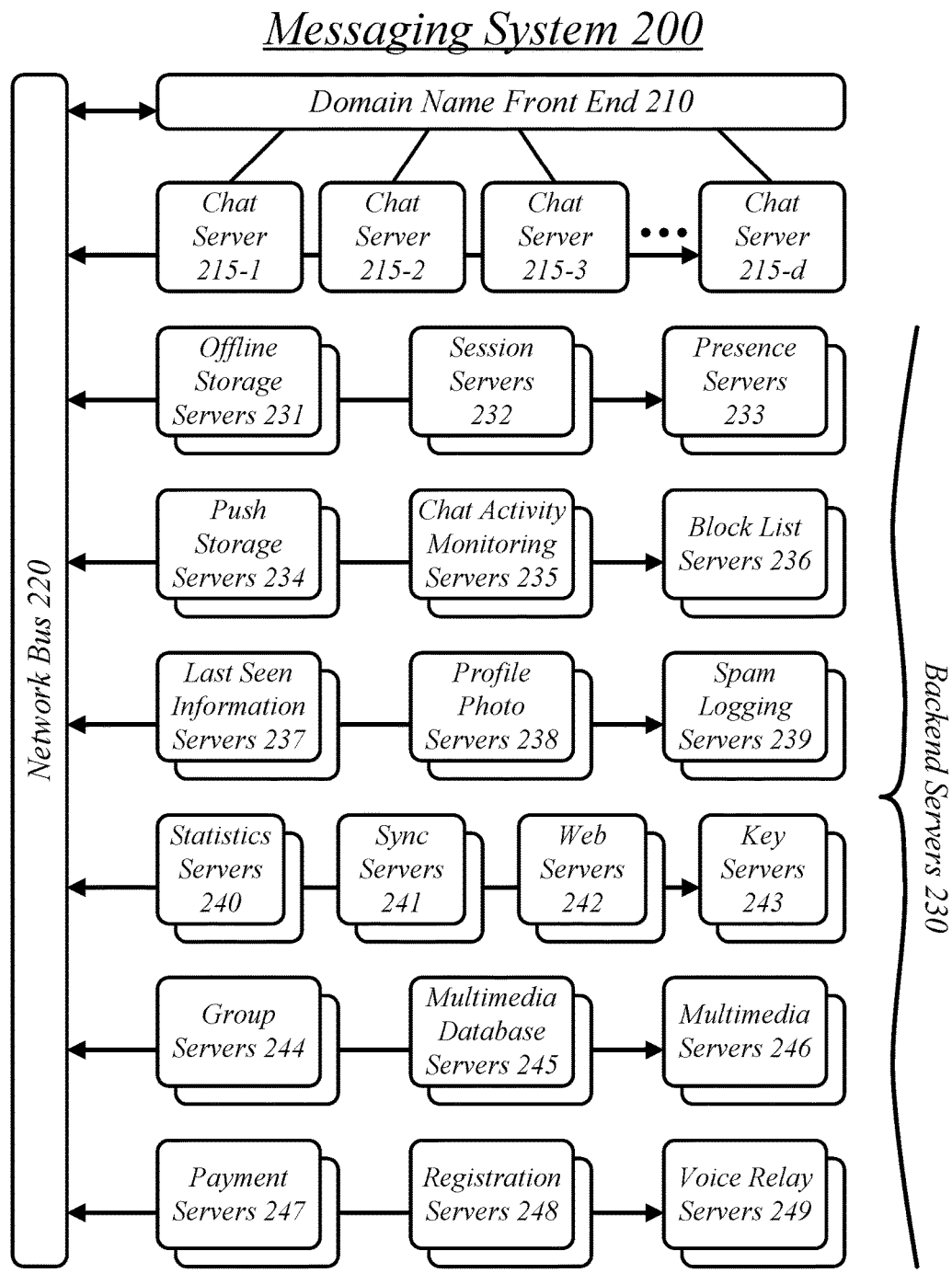
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the streaming media system 100 with the operations of the streaming media system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments, some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the streaming media system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
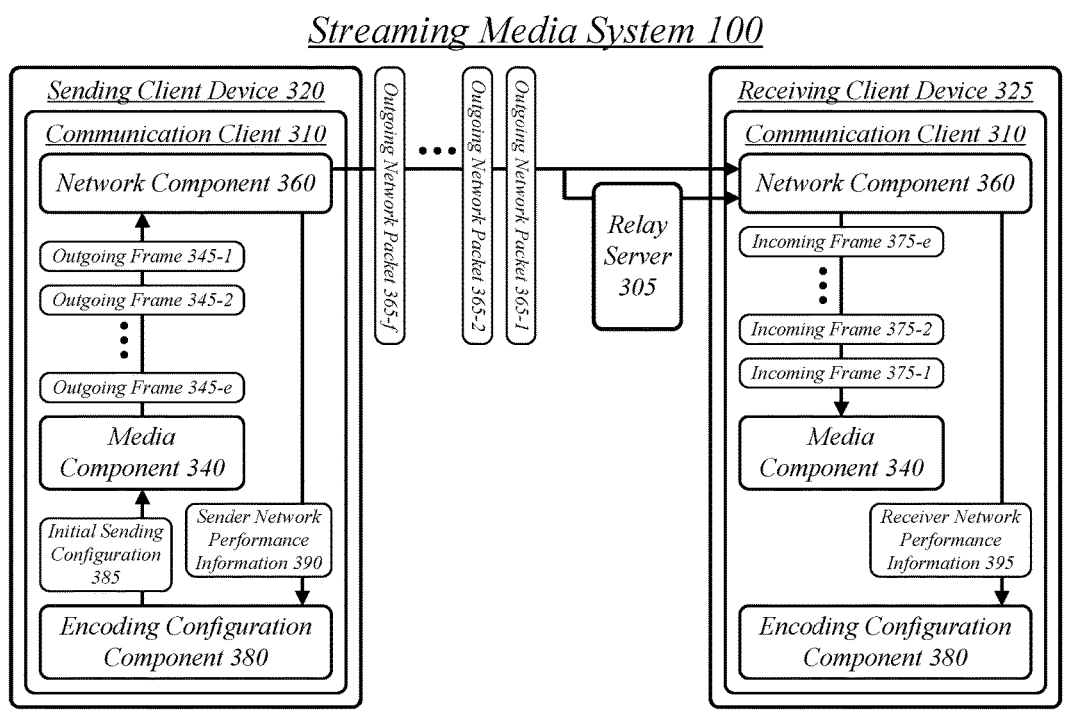
FIG. 3 illustrates an embodiment of a streaming media system with a sending client device sending a sequence of outgoing frames to a receiving client device.

FIG. 3 illustrates an embodiment of a streaming media system 100 with a sending client device 320 sending a sequence of outgoing frames 345 to a receiving client device 325.

A sending client device 320 may engage in a streaming network connection with a receiving client device 325 carrying a media stream. Each of the sending client device 320 and receiving client device 325 may execute an instantiation of a communication client 310. In some cases, the client devices 320, 325 may execute instantiations of different communication clients that conform to a sufficiently common specification to empower interoperability. In some embodiments, the communication client 310 may comprise a messaging client offering media streaming communication services.

In some cases, the streaming network connection may be a direct connection in which the outgoing network packets 365 from the sending client device 320 are addressed to the public-facing address associated with the receiving client device 325 and the outgoing network packets from the receiving client device 325 are addressed to the public-facing address associated with the sending client device 320. In other cases, the streaming network connection may be a relayed connection in which the outgoing network packets from the sending client device 320 and receiving client device 325 are addressed to a relay server 305, with the relay server 305 operative to forward network packets received from one client device to the other client device. A relay server 305 may comprise one relay server of a plurality of relay servers 190 provided as part of a messaging system 110.

A communication client 310 may comprise a network component 360, the streaming component generally arranged to establish and carry out the performance of a streaming network connection carrying streaming media content as a media stream. The streaming network connection may comprise a sequence of network packets. A network packet may comprise a user datagram protocol (UDP) or transmission control protocol (TCP) addressed using the internet protocol (IP), thereby forming UDP/IP or TCP/IP packets. In some embodiments, UDP/IP may be preferentially used as it may be preferable to miss a packet than introduce the additional delay of requesting and receiving a replacement to a missed packet.

The communication client 310 may comprise a media component 340. The media component 340 is generally arranged to manage the generation of the media stream using assigned encoding settings. The media component 340 may interoperate with an encoding component to produce a series of outgoing frames 345. The outgoing frames 345 may comprise audio and/or video frames. An outgoing media frame, such as an audio frame or video frame, may comprise a portion of the media stream over a particular extent of time in which the media content during that period is bundled for decoding as a unit. In exemplary embodiments, the media component 340 may generate a media stream comprising the video stream and an audio stream. The video stream and/or the audio stream may be captured using various devices of the sending client device 320, such as a camera device, microphone device, and/or other sensors.

The encoding component may comprise a hardware encoding component of the sending client device 320. In some embodiments, a hardware encoding component may include an encoding component operative to encode video and/or audio according to various encoding protocols, including one or more Moving Pictures Experts Group (MPEG) protocols (for instance, MPEG-4). A non-limiting example of an MPEG protocol may include the H.264 (MPEG-4 Part 10, Advanced Video Coding (MPEG-4 AVC)) encoding standard and modifications and revisions thereto.

The encoding component may comprise a software encoding component of the communication client 310, the operating system of the sending client device 320, or other software encoding component available to the communication client 310. In various embodiments, the software encoding component may include an encoding component operative to encode video and/or audio according to the VP8 and/or VP9 encoding standards and modifications and revisions thereto. Although MPEG, H.264, VP8, and VP9 are provided as examples herein, embodiments are not so limited as any type of hardware or software encoding component capable of operating according to some embodiments is contemplated herein.

The encoding component may be operative to encode color, brightness, and other visual information of a media stream according to various encoding protocols, such as MPEG protocols, H.264, VP8, VP9, and/or the like. The visual information may be indicated, described, encoded, or otherwise provided using various configurations or color spaces, including, without limitation, RGB, YUV, Y'UV, YCbCr, Y'CbCr, YPbPr, HSL (hue, saturation, lightness), HSV (hue, saturation, value), variations thereof, modifications thereof, and/or combinations thereof. For example, in one embodiment, the encoding component may be operative to encode color and brightness information using a VP8 protocol with a YUV color space.

In various embodiments, the encoding component may be operative to encode a video stream according to one or more encoding modes. In some embodiments, the one or more encoding modes may be used to determine the encoding of visual information for an encoded video stream. Illustrative and non-restrictive examples of visual information may include color, luminance, saturation, brightness, lightness, shading, hue, and/or the like. In some embodiments, the video stream may be encoded to include a plurality of elements, such as pixels. Each element may include or be associated with visual information, such as luminance (luma) and color information for the element.

For digital video encoding, the intensity of each component of the pixel may be represented with a number of bits (for instance, a bit depth). In some embodiments, the number of bits or bit depth may be variable. A bit depth of n can represent 2n different values, for example, 256 values per component for 8 bits and 1024 values per component for 10 bits. For encoding of a video stream, the visual information (for instance, luminance (luma or brightness) and color information) for each element may be expressed with one luminance component and two color components. In various embodiments, the encoding component may encode the video stream using various channels, such as one or more luma channels or chrominance channels. For example, in one embodiment, the encoding component may encode the video stream using one luma channel and two chrominance channels.

In exemplary embodiments, an encoding mode may indicate what color range or number of possible colors the encoding component should use to encode a video stream and, in particular, the luminance and/or color information. Non-limiting examples of encoding modes may include a standard-color mode and a reduced-color mode. In some embodiments, the encoding mode may include or indicate a number of variable bits (or values) for color encoding. In some embodiments, the standard-color mode may include encoding the video stream using a first number of bits (or values), such as a number of bits and/or values specified by an encoding standard used by the encoding component (for instance, a standard or substantially standard YUV color space). Alternatively or in addition, the standard-color mode may include preventing or not using locking bits (for instance, bits locked to a specified value). For example, the encoding component may encode the video stream using a standard-color mode according to an encoding standard that uses 8 bits to encode each of hue and saturation such that 256 different values of each hue and saturation may be represented.

To increase encoding compression, a reduced-color mode may be used to constrain the chrominance values to a limited range of values. In some embodiments, the reduced-color mode may include encoding the video stream using a second number of variable bits for color encoding. The second number of variable bits may be different than the first number of variable bits used in the standard-color mode. In various embodiments, the second number of variable bits of the reduced-color mode may be less than the first number of variable bits of the standard-color mode.

For example, if 8 bits are used to encode each of hue and saturation in the standard-color mode, 256 different values (for instance, the first number of variable bits) of each hue and saturation may be represented in the standard-color mode. In the reduced-color mode, these 256 values may be linearly scaled to a subset of these values, such as 128 values (for instance, the second number of variable bits), thereby halving the color range. Or, in an alternative embodiment of the reduced-color mode, specific bits may be locked to a certain value, such as zero (0). This may be used, among other things, to reduce the color granularity of the video rather than reducing its color range. These techniques may be used individually or in combination.

The media component 340 is operative to generate a media stream at a sending client device 320, the media stream comprising a video stream and an audio stream. The media stream is configured for a sending bitrate. The media stream being configured for the sending bitrate may comprise an assignment of encoding settings to the encoding component. In other embodiments, the media component 340 may perform the media encoding and directly generate the outgoing frames 345. The media content for the media stream may be provided, without limitation, by a capture component of the sending client device 320, such as may receive media content from a camera and/or microphone of the sending client device 320.

The communication client 310 may comprise an encoding configuration component 380. The encoding configuration component 380 determines the encoding settings for use by the media component 340. The encoding configuration component 380 may be generally arranged to determine the encoding settings based on network performance information for the media stream. The encoding configuration component 380 may, however, determine an initial sending configuration 385 independent of network performance information due to it not yet being available to the encoding configuration component 380 of the sending client device 320. In some embodiments, the initial sending configuration 385 may be a predefined initial sending configuration 385 configured for the communication client 310 independent of any network information. In other embodiments, the initial sending configuration 385 may be determined based on network information, such as network information indicating the bandwidth available on the network being used by the sending client device 320.

In some embodiments, the encoding settings may include an encoding mode for encoding the video stream (for example, a video portion of a media stream). The encoding mode may include a standard-color mode and a reduced-color mode. The encoding configuration component 380 may determine the encoding mode based on the network performance information 390 and/or 395. For example, the encoding configuration component 380 may be operative to activate the reduced-color mode with a reduced bitrate based on the network performance information 390 and/or 395, for instance, indicating network congestion for the sending of the video stream from the sending client device 320 to the receiving client device 325. In some embodiments, the media component 340 may generate the video stream in the encoding mode based on the network performance information 390 and/or 395.

In exemplary embodiments, the encoding configuration component 380 may determine the encoding mode based on a threshold determination involving one or more elements of the network performance information 390 and/or 395. For example, the encoding configuration component 380 may determine, specify, trigger, or otherwise cause the media component 340 to encode the media stream in the standard-color mode responsive to a bandwidth being above a bandwidth threshold, and may cause the media component 340 to encode the media stream in the reduced-color mode responsive to the bandwidth being below the bandwidth threshold. The bandwidth may be determined based on the network performance information 390 and/or 395. The bandwidth threshold may be configured, specified, or otherwise determined to be various values, such as about 0 kilobits per second (kbps), about 10 kbps, about 25 kbps, about 50 kbps, about 100 kbps, about 200 kbps, and any value or range of any of these values (including endpoints).

The media component 340 may generate a video stream according to the encoding mode. For example, the media component 340 may generate a video stream at the sending client device 320 using a first number of variable bits for color encoding (for instance, using a number of variable bits of a standard-color mode). The sending client device 320 may receive or generate sender network performance information 390 for the video stream. In some embodiments, the media component 340 may generate the video stream in a reduced-color mode based on the network performance information 390. In exemplary embodiments, the reduced-color mode may use a second number of variable bits for color encoding, in which the second number is less than the first number. The sending client device 320 may send, via network component 360, the video stream to the receiving client device 325 using the reduced-color mode.

In some embodiments, the first number and the second number may have various values. For example, the first number may be 256 (bits) and the second number may be 128 (bits). In various embodiments, the second number may be determined based on a mathematical or other relationship with the first number. For example, the second number may be a ratio or percentage of the first number. For instance, the percentage may be 10%, 25%, 50%, 75%, 90%, or any value or range between any two of these values (including endpoints). In some embodiments, the second number may be determined based on a linear scaling of the first number. In other embodiments, the second number may be determined based on one or more non-linear (for instance, curve, exponential, logarithmic, and/or the like) functions.

In exemplary embodiments, the value of the second number may be based on the network performance information 390. For example, the more that the network performance information 390 deviates from a threshold used to determine whether to use the reduced-color mode, the more that the second number deviates (for instance, is less than) the first number. For instance, using a bandwidth threshold, if the bandwidth is at a first step below a threshold (40 kbps for a 50 kbps threshold), the second number may be 50% of the first number. In another instance, if the bandwidth is at a second step below the threshold (30 kbps), the second number may be 25% of the first number. Embodiments are not limited in this context. In this manner, the reduced-color mode may be used to dynamically react to the network performance information 390.

In various embodiments, the media component 340 may generate the video stream in a reduced-color mode with a reduced bitrate based on the network performance information 390. For example, the video stream may be generated in the reduced-color mode with the reduced bit rate responsive to the network performance information indicating congestion for the sending of the video stream from the sending client device 320 to the receiving client device 325.

In various embodiments, the media component 340 may encode the video stream using various channels, such as one or more chrominance channels. For example, U and V chrominance channels in a YUV color space. Each of the chrominance channels may be associated with a color range for representing colors within the video stream (for instance, a standard color range). In some embodiments, the media component 340 may encode the video stream in the reduced-color mode using a reduced color range for the one or more chrominance channels. The reduced color range may be a reduced range of the standard color range for the one or more chrominance channels. In some embodiments, the reduced-color mode may use the reduced color range for the one or more chrominance channels responsive to the sender network performance information 390. For example, the reduced color range may be used where a target bitrate for the video stream is below a predefined threshold.

The one or more chrominance channels may use bits to represent color information, for example, for pixels of the video stream. The bits may include low-order bits, such as the lowest 4 bits for an 8-bit format or the lowest 6 bits for a 10-bit format. In some embodiments, the low-order bits of the one or more chrominance channels may be restrained when the media component 340 is operating in the reduced-color mode. In various embodiments, restraining the low-order bits may include locking the values of the low-order bits to zero.

Accordingly, in some embodiments, the reduced-color mode may use various when I send you emails just depends on what I'm looking out time I processes to reduce the color information of the video stream. In a variable-bit process, the reduced-color mode may use a reduced number of variable bits to encode the color information of the video stream. In a color range process, the reduced-color mode may use a reduced color range, for example, of one or more chrominance channels. In a bit restraining (or locking) process, the reduced-color mode may restrain certain bits (for instance, low-order bits) of the one or more chrominance channels to a certain value (for instance, zero). The reduced-color mode may use the variable-bit process, the color range process, and the bit restraining process alone or in combination.

In various embodiments, the reduced color mode may use the variable-bit process, the color range process, and/or the bit restraining process based on comparing the network performance information to one or more threshold values. For example, the reduced color mode may use the color range process of using a reduced color range for the one or more chrominance channels where a target bitrate for the video stream is below a first predefined threshold. In another example, the reduced-color mode may use both a reduced color range for the one or more chrominance channels (for instance, the color range process) and restraining one or more low-order bits of the one or more chrominance channels to zero (for instance, the bit restraining process) where a target bitrate for the video stream is below a second predefined threshold, in which the second predefined threshold lower than the first predefined threshold.

In some embodiments, the media component 340 may generate the video stream based on a source video stream. For example, sending client device 320 may receive or otherwise access a source video stream from a source, such as a memory, a database, and/or a server or other computing device. The source video stream may have been generated with a source color range. The media component 340 may generate the video stream based on the source video stream using the reduced-color mode by scaling the source color range for the source video stream to the reduced color range. In various embodiments, the scaling may include a linear scaling. In other embodiments, the scaling may be determined based on one or more non-linear (for instance, curve, exponential, logarithmic, and/or the like) functions.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 4A illustrates one embodiment of a logic flow 400A. The logic flow 400A may be representative of some or all of the operations executed by one or more embodiments described herein.

In the illustrated embodiment shown in FIG. 4A, the logic flow 400A may generate a video stream at a sending device using a first number of variable bits for color encoding at block 402. For example, sending client device 320 may generate, via media component 340, a video stream using a first number of variable bits for color encoding (for instance, using a number of variable bits of a standard-color mode). The logic flow 400A may send the video stream from the sending device to a receiving device at block 404. For example, the sending client device 320 may send, via network component 360, the video stream to the receiving client device 325.

At block 406, logic flow 400A may receive network performance information for the video stream. For example, encoding configuration component 380 of sending client device 320 may receive sender network performance information 390. Logic flow 400A may generate the video stream in a reduced-color mode based on the network performance information, wherein the reduced-color mode uses a second number of variable bits for color encoding, the second number less than the first number at block 408. For example, the media component 340 of sending client device 320 may generate the video stream in a reduced-color mode based on the network performance information 390. In exemplary embodiments, the reduced-color mode may use a second number of variable bits for color encoding, in which the second number is less than the first number. At block 410, the logic flow 400A may send the video stream from the sending device to the receiving device using the reduced-color mode. For example, the sending client device 320 may send, via network component 360, the video stream to the receiving client device 325 using the reduced-color mode.

FIG. 4B illustrates one embodiment of a logic flow 400B. The logic flow 400B may be representative of some or all of the operations executed by one or more embodiments described herein.

In the illustrated embodiment shown in FIG. 4B, the logic flow 400B may receive a video stream at a server device from a sending device, the video stream generated at the sending device using a first number of variable bits for color encoding at block 422. For example, the relay server 305 may receive a video stream generated at the sending client device 320 using a first number of variable bits for color encoding (for instance, according to a standard-color mode). At block 424, the logic flow 400B may send the video stream to a receiving device. For example, the relay server 305 may send the video stream to the receiving client device 325.

The logic flow 400B may receive the video stream from the sending device in a reduced-color mode based on network performance information, in which the reduced-color mode uses a second number of variable bits for color encoding, the second number less than the first number at block 426. For example, relay server 305 may receive the video stream generated by sending client device 320 in a reduced-color mode based on the network performance information 390. The reduced-color mode may use a second number of variable bits for color encoding, in which the second number is less than the first number. At block 428, the logic flow 400B may send the video stream to the receiving device, the video stream using the reduced-color mode. For example, the relay server 305 may send the video stream generated by the sending client device 320 in the reduced-color mode to the receiving client device 325.

The embodiments are not limited to these examples.

Figure 5:
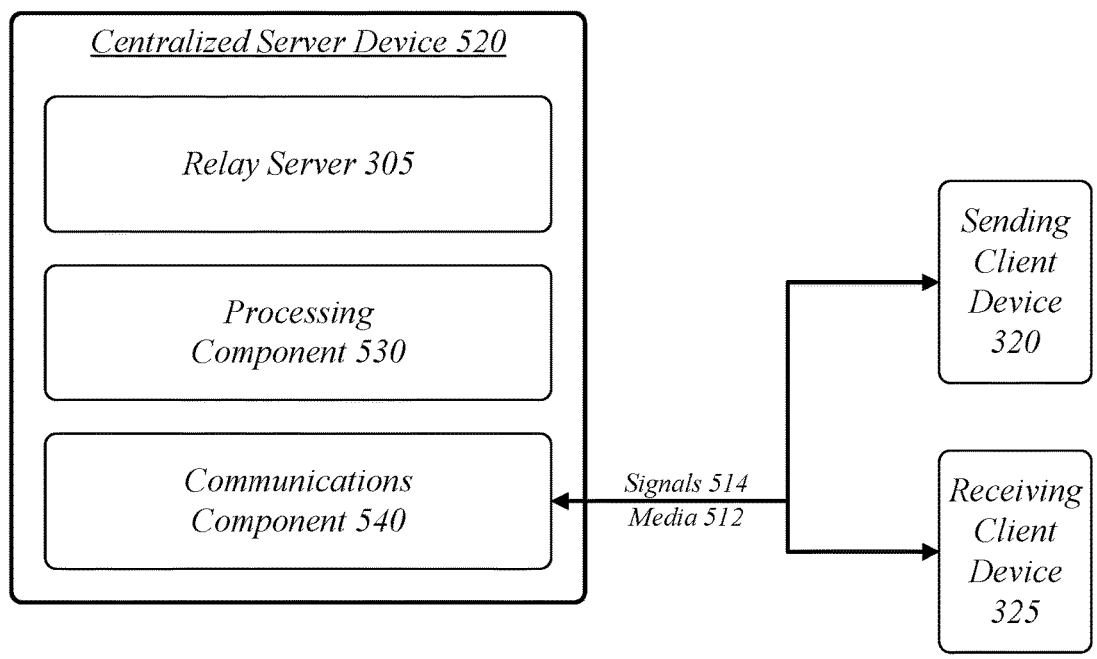
FIG. 5 illustrates an embodiment of a centralized system for the streaming media system of FIG. 1.

FIG. 5 illustrates a block diagram of a centralized system 500. The centralized system 500 may implement some or all of the structure and/or operations for the streaming media system 100 in a single computing entity, such as entirely within a single centralized server device 520.

The centralized server device 520 may comprise any electronic device capable of receiving, processing, and sending information for the streaming media system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 520 may execute processing operations or logic for the streaming media system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 520 may execute communications operations or logic for the streaming media system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 520 may communicate with other devices over a communications media 512 using communications signals 514 via the communications component 540. The centralized server device 520 may execute a relay server 305, the relay server 305 operative to assist in the performance of streaming network connections. The relay server 305 may receive and forward network packets between the sending client device 320 and receiving client device 325 as assistance to the performance of a streaming network connection, the receiving and forwarding of network packets comprising at least a portion of the signals 314 transmitted via media 312.

Figure 6:
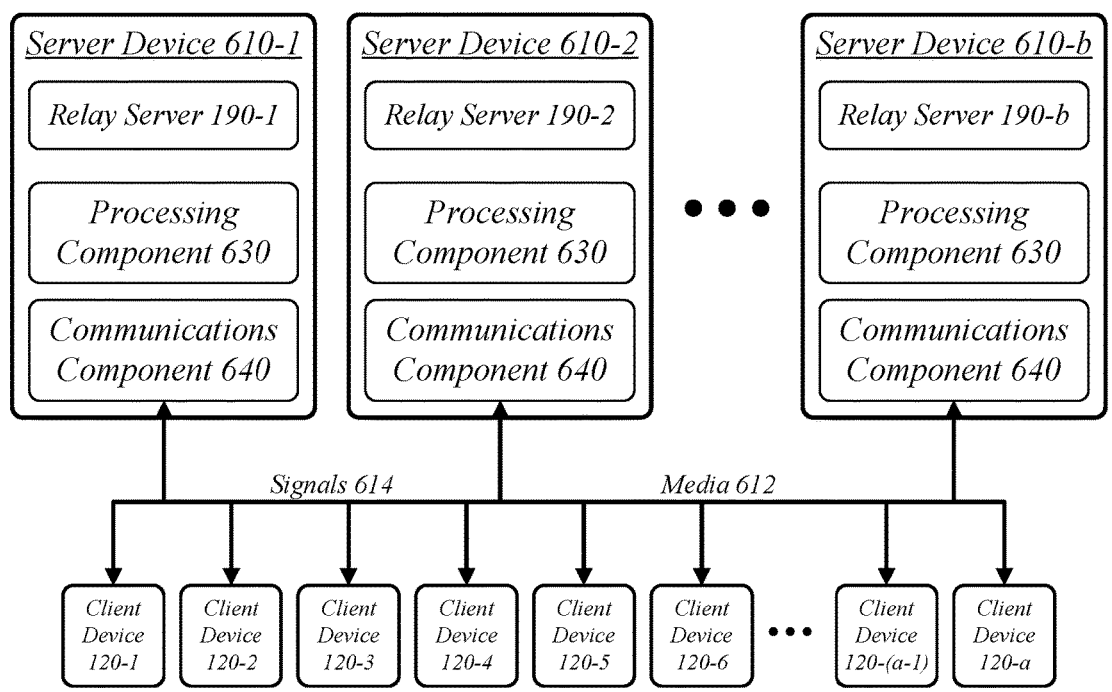
FIG. 6 illustrates an embodiment of a distributed system for the streaming media system of FIG. 1.

FIG. 6 illustrates a block diagram of a distributed system 600. The distributed system 600 may distribute portions of the structure and/or operations for the streaming media system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a plurality of server devices 610. In general, the server devices 610 may be the same or similar to the centralized server device 510 as described with reference to FIG. 5. For instance, the server devices 610, 650 may each comprise a processing component 630 and a communications component 640 which are the same or similar to the processing component 530 and the communications component 540, respectively, as described with reference to FIG. 5. In another example, the server devices 610, 650 may communicate over a communications media 612 using communications signals 614 via the communications components 640.

The server devices 610 may comprise or employ one or more programs that operate to perform various methodologies in accordance with the described embodiments. In one embodiment, for example, the server devices 610 may each implement a relay server of a plurality of relay servers 190, as described with reference to FIG. 1.

Figure 7:
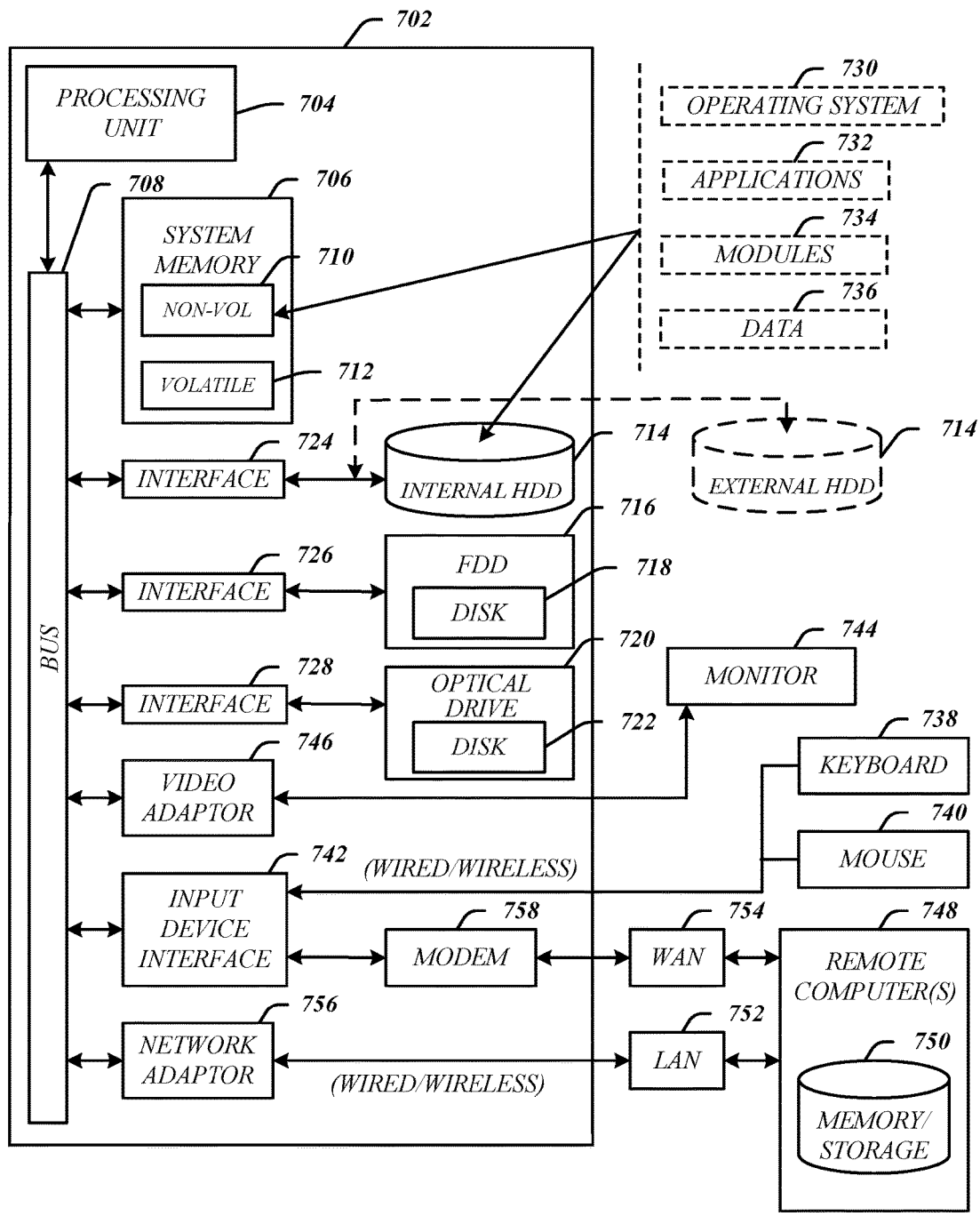
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
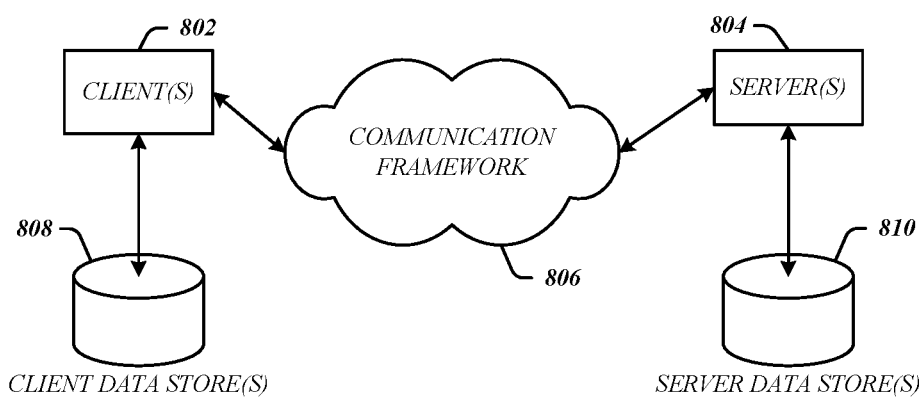
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client devices 120, 320, 325. The servers 804 may implement the relay servers 190, 305. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
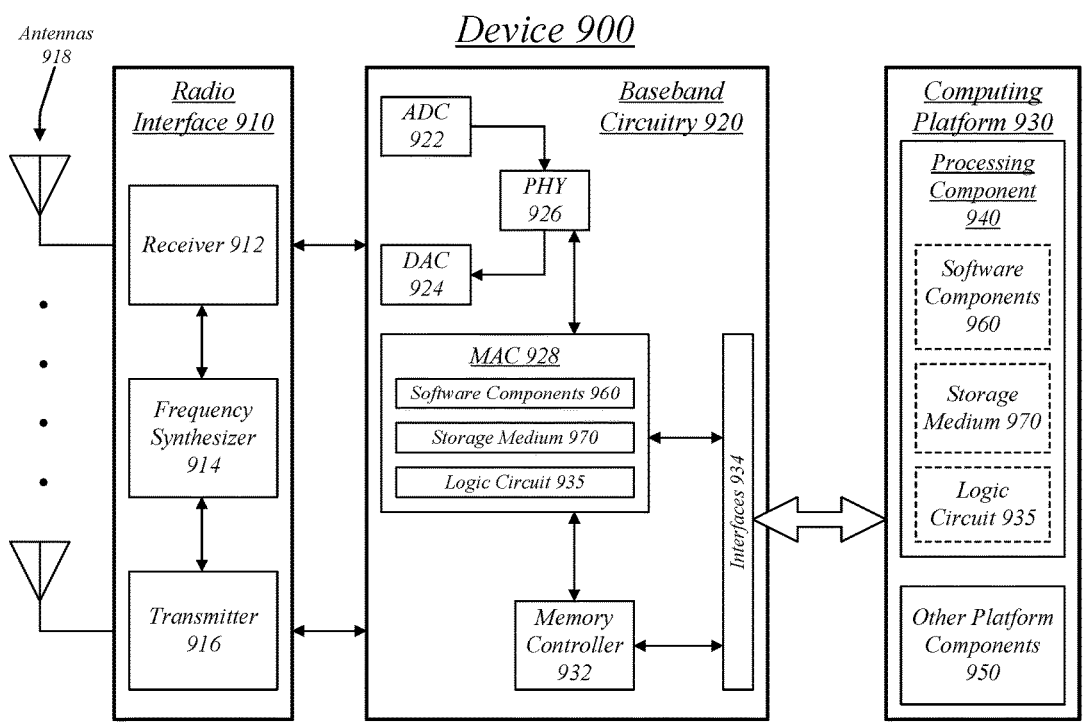
FIG. 9 illustrates an embodiment of a radio device architecture.

FIG. 9 illustrates an embodiment of a device 900 for use in a multicarrier OFDM system, such as the system 100. Device 900 may implement, for example, software components 960 as described with reference to system 100 and/or a logic circuit 935. The logic circuit 935 may include physical circuits to perform operations described for the system 100. As shown in FIG. 9, device 900 may include a radio interface 910, baseband circuitry 920, and computing platform 930, although embodiments are not limited to this configuration.

The device 900 may implement some or all of the structure and/or operations for the system 100 and/or logic circuit 935 in a single computing entity, such as entirely within a single device. Alternatively, the device 900 may distribute portions of the structure and/or operations for the system 100 and/or logic circuit 935 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 910 may include, for example, a receiver 912, a transmitter 916 and/or a frequency synthesizer 914. Radio interface 910 may include bias controls, a crystal oscillator and/or one or more antennas 918. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 956 for PHY link layer processing of respective receive/transmit signals. Baseband circuitry 920 may include, for example, a processing circuit 928 for medium access control (MAC)/data link layer processing. Baseband circuitry 920 may include a memory controller 932 for communicating with processing circuit 928 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames, such as radio frames. Alternatively or in addition, MAC processing circuit 928 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for the system 100 and logic circuit 935 using the processing component 940. The processing component 940 (and/or PHY 926 and/or MAC 928) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired. In some embodiments, device 900 may be configured to be compatible with protocols and frequencies associated one or more of the 3GPP LTE Specifications and/or IEEE 902.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a video stream at a server device from a sending device, the video stream generated at the sending device using a first number of variable bits for color encoding, sending the video stream to a receiving device, receiving the video stream from the sending device in a reduced-color mode based on network performance information, wherein the reduced-color mode uses a second number of variable bits for color encoding, the second number less than the first number, and sending the video stream to the receiving device, the video stream using the reduced-color mode.

A computer-implemented method may further comprise the video stream encoded using one or more chrominance channels, the reduced-color mode using a reduced color range for the one or more chrominance channels.

A computer-implemented method may also comprise the video stream encoded using one or more chrominance channels, the reduced-color mode restraining one or more low-order bits of the one or more chrominance channels to zero.

A computer-implemented method may additionally comprise the video stream encoded using one or more chrominance channels, the reduced-color mode using a reduced color range for the one or more chrominance channels where a target bitrate for the video stream is below a first predefined threshold, the reduced-color mode both using a reduced color range for the one or more chrominance channels and restraining one or more low-order bits of the one or more chrominance channels to zero where a target bitrate for the video stream is below a second predefined threshold, the second predefined threshold lower than the first predefined threshold.

An apparatus may comprise an encoding configuration component operative to receive network performance information for a video stream at a sending device, the video stream using a first number of variable bits for color encoding; and assign a reduced-color mode to a media component based on the network performance information, the media component operative to generate the video stream in the reduced-color mode, wherein the reduced-color mode uses a second number of variable bits for color encoding, the second number less than the first number, and a network component operative to send the video stream from the sending device to a receiving device using the reduced-color mode. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. At least one non-transitory computer-readable storage medium comprising instructions that, when executed, cause a system to:
   generate a video stream at a sending device using a first number of variable bits for color encoding;
   send the video stream from the sending device to a receiving device;
   receive network performance information for the video stream;
   determining that the network performance information falls below a first threshold used to determine whether to use a reduced-color mode;
   generate the video stream in the reduced-color mode based on the network performance information, wherein the reduced-color mode uses a second number of variable bits for color encoding, the second number of variable bits less than the first number of variable bits, the second number of variable bits being a function of the difference between the network performance information and the first threshold; and send the video stream from the sending device to the receiving device using the reduced-color mode.

2. The non-transitory computer-readable storage medium of claim 1, comprising further instructions that, when executed, cause a system to:
generate the video stream in a reduced-color mode with reduced bitrate based on the network performance information indicating network congestion for the sending of the video stream from the sending device to the receiving device.

3. The non-transitory computer-readable storage medium of claim 1, the video stream encoded using one or more chrominance channels, the reduced-color mode using a reduced color range for the one or more chrominance channels.

4. The non-transitory computer-readable storage medium of claim 1, the video stream generated based on a source video stream, the reduced-color mode comprising a scaling of a source color range for the source video stream to a reduced color range.

5. The non-transitory computer-readable storage medium of claim 1, wherein the color information includes one or more chrominance channels, comprising further instructions that, when executed, further cause a system to:
determine a target bitrate for the video stream based on the performance information;
use a reduced color range for some or all of the chrominance channels when the target bitrate falls below the first threshold; and
use a reduced color range for some or all of the chrominance channels and restraining one or more low-order bits of some or all of the chrominance channels to zero when the target bitrate falls below a second threshold;
wherein the second threshold is lower than the first threshold.

6. The non-transitory computer-readable storage medium of claim 1, the video stream encoded using one or more chrominance channels, the reduced-color mode restraining one or more low-order bits of the one or more chrominance channels to zero.

7. An apparatus, comprising:
an encoding configuration component operative to:
receive network performance information for a video stream at a sending device, the video stream using a first number of variable bits for color encoding; and
assign a reduced-color mode to a media component based on the network performance information;
the media component operative to:
determine that the network performance information falls below a first threshold used to determine whether to use a reduced-color mode; and
generate the video stream in the reduced-color mode, wherein the reduced-color mode uses a second number of variable bits for color encoding, the second number of variable bits less than the first number of variable bits, the second number of variable bits being a function of the difference between the network performance information and the first threshold; and
a network component operative to:
send the video stream from the sending device to a receiving device using the reduced-color mode.

8. The apparatus of claim 7, further comprising:
the encoding configuration component operative to activate the reduced-color mode with reduced bitrate based on the network performance information indicating network congestion for the sending of the video stream from the sending device to the receiving device.

9. The apparatus of claim 7, the video stream encoded using one or more chrominance channels, the reduced-color mode using a reduced color range for the one or more chrominance channels.

10. The apparatus of claim 7, the video stream generated based on a source video stream, the reduced-color mode comprising a scaling of a source color range for the source video stream to a reduced color range.

11. The apparatus of claim 7, wherein the color information includes one or more chrominance channels, the media component further operative to:
determine a target bitrate for the video stream based on the performance information;
use a reduced color range for some or all of the chrominance channels when the target bitrate falls below the first threshold; and
use a reduced color range for some or all of the chrominance channels and restraining one or more low-order bits of some or all of the chrominance channels to zero when the target bitrate falls below a second threshold;
wherein the second threshold is lower than the first threshold.

12. The apparatus of claim 7, the video stream encoded using one or more chrominance channels, the reduced-color mode restraining one or more low-order bits of the one or more chrominance channels to zero.

13. A computer-implemented method, comprising:
receiving a video stream at a server device from a sending device, the video stream generated at the sending device using a first number of variable bits for color encoding;
sending the video stream to a receiving device;
receiving the video stream from the sending device in a reduced-color mode based on network performance information; and
sending the video stream to the receiving device, the video stream using the reduced-color mode;
wherein the reduced-color mode uses a second number of variable bits for color encoding, the second number of variable bits less than the first number of variable bits, the second number of variable bits being a function of the difference between the network performance information and a first threshold.

14. The method of claim 13, the video stream encoded using one or more chrominance channels, the reduced-color mode using a reduced color range for the one or more chrominance channels.

15. The method of claim 13, the video stream encoded using one or more chrominance channels, the reduced-color mode restraining one or more low-order bits of the one or more chrominance channels to zero.

16. The method of claim 13, the video stream encoded using one or more chrominance channels, the reduced-color mode using a reduced color range for the one or more chrominance channels where a target bitrate for the video stream is below the first threshold, the reduced-color mode using both a reduced color range for the one or more chrominance channels and restraining one or more low-order bits of the one or more chrominance channels to zero where a target bitrate for the video stream is below a second threshold, wherein the second threshold is lower than the first threshold.

* * * * *